Patented Dec. 22, 1942

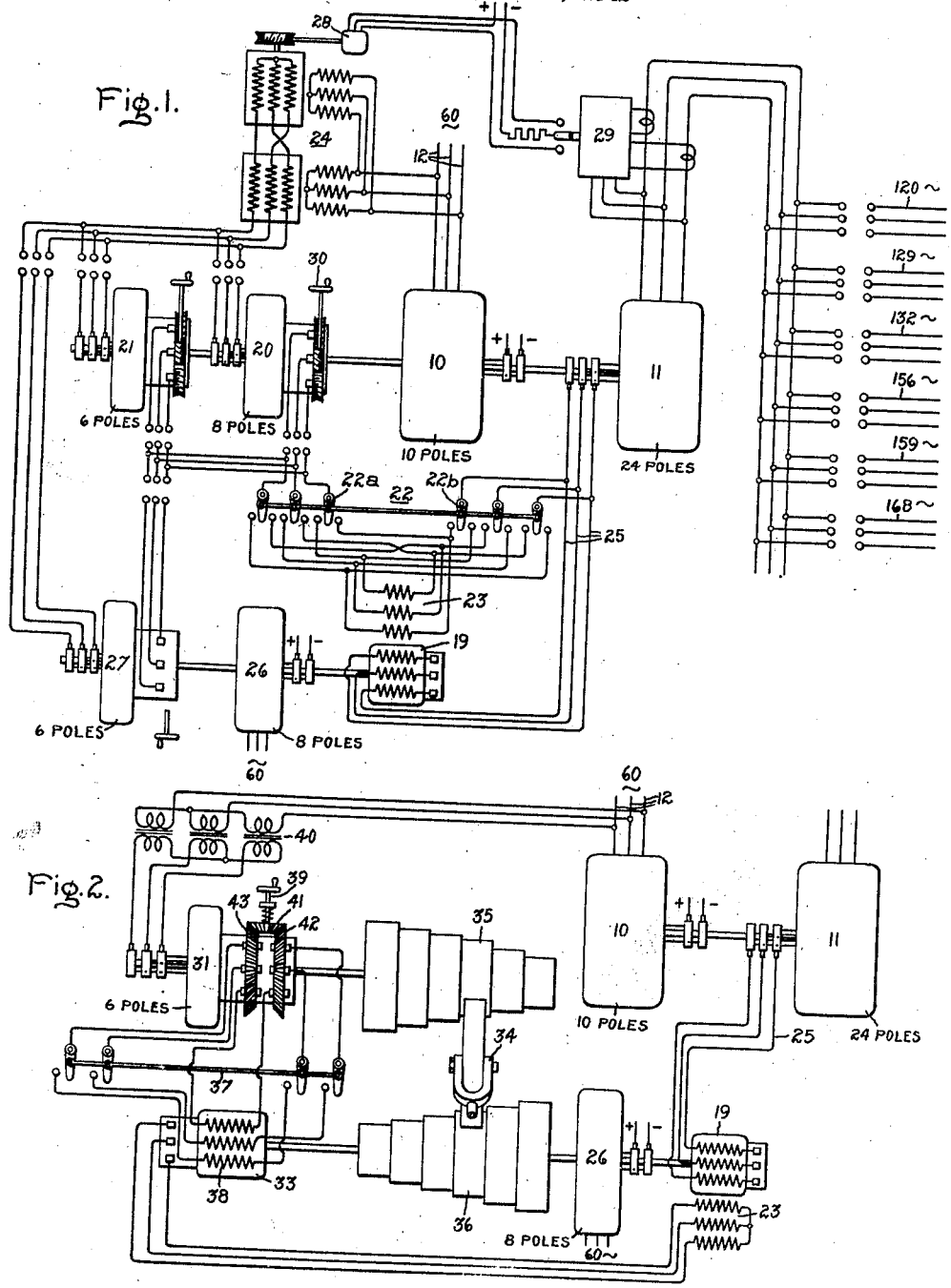

2,306,225

UNITED STATES PATENT OFFICE 2,306,225

FREQUENCY CONVERTER

Percy W. Robinson, Scotia, N. Y., assignor to General Electric Company, a corporation of New York Application April 11, 1942, Serial No. 438,553

7 Claims. (Cl. 172—281)

My invention relates to frequency converters and in particular to a frequency converter set by means of which a plurality of fixed ratio frequency conversions may be had with the same apparatus involving two main alternating current machines and auxiliary exciting apparatus.

The features of my invention which are believed to be novel and patentable will be pointed out in the claims appended hereto. For a better understanding of my invention reference is made in the following description to the accompanying drawing in which Fig. 1 represents a frequency changer set and auxiliary exciting apparatus by means of which six different fixed ratio frequency conversions may be had. Fig. 2 illustrates the invention using other forms of auxiliary regulating apparatus that may be used in place of that represented by certain parts in Fig. 1. Twelve different fixed ratio frequency conversions are available with the apparatus of Fig. 2.

Referring to Fig. 1, 10 and 11 represent two direct connected alternating current machines comprising the main machines of my frequency converting apparatus. 10 is a normal synchronous machine and 11 is built like a wound secondary induction machine but its secondary is excited with alternating current and it operates in effect as a synchronous machine with no slip.

The machine 10 has its primary connected to a power system 12 which for the purpose of giving a specific example will be assumed to be a 60-cycle system. It will be noted that the stator winding terminals of machine 11 are provided with six switches by means of which this machine can be connected to any one of six power systems. These six power systems are of different frequencies and also different from system 12. Such systems may be supplied by other power generating apparatus so as to transfer power through my frequency converter set to system 12 or they may be systems supplied entirely by machine 11. In the latter case, of course, machine 11 may supply power at any one of six frequencies to any one of such systems at different times, or it may supply all six systems at one frequency at one time. The point which I wish to emphasize by showing six different systems connectable to machine 11 is that with the apparatus shown in Fig. 1 and to be described, power may be transmitted through the set in either direction at any one of six different fixed frequency ratios. This is accomplished with the machines running in one direction at the same speed and without changing the number of poles on the main set comprising machines 10 and 11. The set 10—11 therefore is comparable in design, cost and efficiency to the conventional two unit single ratio frequency changer set.

The change in frequency ratio of conversion is obtained by changing the frequency and the direction of phase rotation of the polyphase alternating current excitation supplied to the rotor secondary winding of machine 11. Such excitation is supplied from an exciter 19 in turn excited from a frequency converter 20, 21 or 27. The frequency of excitation supplied to the secondary of machine 19 is determined by the frequency of system 12 and the frequency conversion ratio of machines 20, 21 or 27 used alternatively and the phase rotation of such excitation is determined by a phase reversing switch 22 for the field winding 23 of exciter 19. Preferably machine 19 also has a series compensating winding as shown.

It will be assumed in the description which follows that synchronous machine 10 has ten poles and therefore fixes the speed of the frequency changer set 10—11 at 720 R. P. M. Machine 11 will be assumed to have twenty-four poles. It will be assumed that frequency changer exciter 20 has eight poles. Using frequency changer exciter 20 its slip rings will be fed through a double induction regulator 24 from the 60 cycle line 12, and its polyphase commutator brushes will be connected to supply excitation to winding 23 of exciter 19. The phase rotation of the input to the slip rings of the frequency changer exciter 20 is made such that the direction of rotation of the field in its rotor is opposed to that of mechanical rotation. Hence the frequency at its commutator brushes is in this case 12 cycles. Theoretically, it would be possible to have the rotating magnetic field in the rotor of machine 20 in the same direction as that of mechanical rotation to obtain a frequency of 108 cycles at its commutator but this is impracticable because A.-C. exciter machines of the type shown at 19 cannot be designed to operate practicably at such frequencies. To provide a practicable installation, the frequency supplied to the A.-C. exciter machine 19 should not exceed about 25 cycles.

With the switch 22 thrown in either direction, excitation is supplied to field winding 23 of machine 19 partially from frequency changer exciter 20 through switch section 22a and partially from machine 19 itself through switch section 22b and in either case 12 cycle excitation is supplied to the secondary rotor of machine 11 through lines 25. However, with switch 22 thrown to the left, the phase rotation of such excitation is in one direction and with switch 22 thrown to the right the 12 cycle excitation introduced in the rotor secondary of machine 11 is in the opposite direction.

When the magnetic field excitation of the rotor of the twenty-four pole machine 11 is in the same direction as that of mechanical rotation of 720 R. P. M. the frequency generated at the stator terminals of machine 11 is 156 cycles. If the rotating field in the rotor is opposite to that of mechanical rotation the frequency generated at the stator terminals of machine 11 is 132 cycles. This follows from the fact that with D.-C. excitation the twenty-four pole machine 11 running at 720 R. P. M. would generate 144 cycles so that with ±12 cycle excitation its frequency would be 144±12=156 or 132 cycles.

Now, let it be assumed that the eight pole frequency changer exciter 20 is disconnected and that the six pole frequency changer exciter 21 is connected in its place by the switches indicated for that purpose. In this case the frequency generated at its commutator is 24 cycles. Using exciter 20 the machine 11 will generate either 168 or 120 cycles. Thus, with the apparatus thus far described, the combination may be used as a fixed ratio frequency changer transferring power in either direction between a 60 cycle system and 120, 132, 156 and 168 cycle systems or between other frequency systems of like frequency ratios, as for example between a 25 cycle system and 50, 55, 65 and 70 cycle systems. Other ratios may be had by selecting machines of different pole number combinations. For example, with the same combination except making machine 11 with 26 poles, frequencies of 180, 168, 144 and 132 cycles will be generated at the stator terminals of machine 11.

If I make machine 10 with eight poles, machine 11 with eighteen poles and use a frequency changer exciter with six poles, I will have a frequency changer set for connection between a 60 cycle system and either 150 or 120 cycle systems.

The frequency relations possible may be expressed by formulae as follows:

$$F_1 = F\left[\frac{P_1}{P} \pm \left(1 - \frac{P_2}{P}\right)\right]$$

where $F_1$ is the frequency of machine 11
$F$, the frequency of machine 10
$P_1$, the number of poles of machine 11
$P$, the number of poles of machine 10, and
$P_2$, the number of poles of machine 20 or other exciter used.

The machine 19 may be driven by either a synchronous or induction motor represented at 26 and such machine may act as either a motor or a generator, depending upon the direction of power flow between the systems and may be connected to either frequency system in use. However, in general it will be desirable to connect machine 26 to the constant frequency system 12, otherwise the machine 19 will have to operate at the different speeds corresponding to the different frequencies available at the stator terminals of machine 11. It is important that the excitation be supplied at a frequency which is fixed in relation to the frequency of system 12 or synchronous machine 10.

If machine 26 is a synchronous machine connected to system 12, frequency changer exciters such as 20 and 21 may be driven thereby instead of by synchronous machine 10. This will make possible still other frequency ratio combinations. To illustrate this point I have represented a third frequency converter exciter 27 driven by machine 26. It will now be assumed that such frequency converter is connected between regulator 24 and machine 19 in place of exciter 20. I will also assume that machine 26 is an eight pole synchronous machine and machine 27 has six poles. The difference in frequency ratio available by such combination is brought about by the fact that machine 27 is now driven at 900 R. P. M. by motor 26 instead of 720 R. P. M. by motor 19. The excitation frequency produced by machine 27 will therefore be 15 cycles making possible additional frequencies of 144±15=159 and 129 cycles at the terminals of the 24 pole 720 R. P. M. machine 11.

Where the frequency changer exciter or exciters are driven by either motor 10 or 26 the formula previously given may be changed to apply to either condition as follows:

$$F_1 = F\left[\frac{P_1}{P} \pm \left(1 - \frac{P_2}{P_3}\right)\right]$$

where $P_3$ is the number of poles of the machine which is used to drive the frequency changing exciter used.

From the explanation given above, the wide number of frequency ratios possible, although not specifically mentioned, will be evident. The regulator 24 serves the purpose of regulating the amount of excitation to the machine 19 thus regulating the power factor of the machine 11. The regulator 24 also makes it possible to furnish a reduced excitation voltage to the rotor of machine 11 for any purpose desirable in the starting or stopping of the set or in synchronizing. This regulator is represented as the double induction type for furnishing an output voltage adjustable in amount but of constant phase. Any other type of regulator which accomplishes this purpose may be used. I have represented the regulator as adjustable by a pilot motor 28 under the control of a contact making meter 29 connected in the main supply lines to machine 11 in order that automatic control may be had. The meter 29 may be a power factor meter, a reactive kva. meter or a voltmeter depending upon the nature of the control desired. The contact mechanism of the meter is made accessible in order that it may be operated manually as conditions require.

I have shown the brushes of the frequency changer exciters adjustable as by a hand wheel 30. By such adjustment the phase position relation of the rotating magnetic fields in the machines 10 and 11 may be altered to add or subtract load or change the direction of load transfer between different power systems of fixed frequency through the frequency changer set. This serves the same result, but at greatly reduced cost, as is sometimes obtained in a conventional fixed ratio frequency changer set by rotatively shifting the stator of one of the main machines.

In Fig. 2 the machines 10, 11, 19 and 26 are similar to those of corresponding number in Fig. 1. The frequency changer exciter 31 used in Fig. 2 is of a type similar to those used in Fig. 1 except that it has a double set of relatively adjustable polyphase brushes and brush yokes 42 and 43. These brushes may be connected to exciting winding 23 of the main A.-C. exciter machine 19 directly to supply all of the excitation thereof if the machine 31 be of large enough capacity but it may be more economical to amplify this excitation by first passing it through a second A.-C. exciter 33 as illustrated. The frequency changer exciter 31 and the A.-C. exciter 33 are shown driven by synchronous motor 26 which drives the main A.-C. exciter 19. However, one or both of machines 31 or 33 may be driven by motor 10. I have shown the frequency changer exciter driven from motor 26 through a speed changing device here represented as a shiftable gear 34 and different sized gears at 35 and 36 by means of which six different frequencies corresponding to six different speeds may be obtained from the frequency changer exciter 31.

The voltage variation of the output of the frequency changer exciter 31 is obtained by relative displacement of its three pairs of brushes, one pair being connected across each field winding 38 of the A.-C. exciter machine 33. A brush shifting device 39 which displaces the brushes equally in opposite directions from a given point is employed. The rotor slip rings of the A.-C. exciter 31 are supplied from the 60 cycle source 12 preferably through a voltage reducing transformer 40.

The phase rotation of the A.-C. excitation supplied to machine 11 and to machine 19 is reversed by providing a switch 37 for reversing the direction of phase rotation of the excitation of field windings 38 of A.-C. exciter 33. Thus with six different speeds of the frequency changer, exciter 31 six different excitation frequencies for the rotor of machine 11 are available and by reversing the phase rotation of such excitation causing it to rotate the same or in the opposite direction to mechanical rotation in machine 11, twelve different frequencies are available at its stator terminals. For example, assume machine 11 has 24 poles and is driven at 720 R. P. M. by the ten pole, 60 cycle synchronous machine 10 and assume the frequency changer exciter 31 has six poles. The following table gives the practicable frequencies obtainable for different speeds of the frequency changer exciter 31.

| Speed in R. P. M. of machine 31 | Frequency output of machine 31 | Frequencies at stator terminals of machine 11 |
| --- | --- | --- |
| 740 | 23 | 167 and 121 |
| 820 | 19 | 163 and 125 |
| 900 | 15 | 159 and 129 |
| 980 | 11 | 155 and 133 |
| 1060 | 67 | 151 and 137 |
| 1140 | 3 | 147 and 141 |

The shiftable gearing 34 is shown engaging gears at 35 and 36 of the same size so that the machine 31 is now coupled to run at the same speed as driving motor 26 or 900 R. P. M. where motor 26 has eight poles and is supplied from a 60 cycle source.

The machines 26 and 19 should be designed for the maximum power input to or output from the rotor of machine 11 which will occur when 23 cycle excitation is supplied to the rotor of machine 11. The relative capacities of machines 11 and 19 should be about in proportion to the frequencies $$\frac{144}{23}$$

or machine 19 should have at least ⅙ of the capacity of machine 19. Where, as here, the machines 31 and 33 are also driven by machines 26 or 19 allowance should also be made therefor. Where the set 10—11 is used to transfer power between different power systems the load on the set may be adjusted by shifting all of the brushes of machine 31 in the same direction. In order that this may be possible I have shown the gear 41 normally meshing with both brush yokes 42 and 43 as disengageable therewith.

One more fact should be mentioned. It is of advantage, when feasible to run the frequency changing exciter above its synchronous speed instead of below because the current delivered from the commutator is always lagging as it feeds an inductive circuit and the lagging component of current from the commutator brushes produces demagnetizing ampere turns in the winding at speeds below synchronism and magnetizing ampere turns at speeds above synchronism. This may be explained as follows: At synchronous speed the frequency of the voltage at the commutator brushes is zero (direct current) so that the axis of armature reaction from the direct current delivered from the brushes is the same as in a rotary converter, that is, 90 electrical degrees in the direction of rotation from the axis of the main flux.

At speeds below or above synchronism the frequency of the voltage at the commutator brushes is proportional to the departure from synchronous speed and the axis of armature reaction for a lagging wattless component of A. C. current delivered from the commutator brushes is, of course, 90 electrical degrees behind the armature reaction at zero frequency where the current is always in phase with the voltage.

When the frequency changing exciter operates below synchronism the phase sequence of the voltage from the commutator brushes is in the direction opposite to mechanical rotation. Hence, the axis of the armature reaction from a lagging component of current delivered from the brushes is 90 electrical degrees later than the voltage or 90 electrical degrees in space in the direction of mechanical rotation from the position at synchronous speed. This brings the axis of armature reaction 180 electrical degrees away from the axis of the main flux or directly in opposition to this flux.

However, at speeds above synchronism the phase sequence of the voltage from the commutator brushes is in the same direction as mechanical rotation. Hence, the axis of the armature reaction from a lagging component of current delivered from the commutator brushes is 90 electrical degrees in space in the direction opposite to mechanical rotation from the position at synchronous speed. This brings the axis of armature reaction directly in phase with the axis of the main flux so that a lagging component of current delivered from the commutator brushes acts to aid in magnetizing the core, thus reducing the required magnetizing kva. from the source of power and also reducing the amount of copper required in the windings.

In the description of Figs. 1 and 2 I have given pole number examples by means of which the frequency changer exciters may be driven above or below their synchronous speeds. For example, in Fig. 1 frequency changer exciters 20 and 21 are driven below their synchronous speeds whereas frequency changer 27 is driven above its synchronous speed. In Fig. 2 frequency changer 31 may be driven above or below its synchronous speed by changing the gear shift and while, as pointed out above it is advantageous to drive the frequency changer exciter above its synchronous speed, for the reasons explained the invention is not limited in this respect.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A frequency changer set comprising a pair of mechanically connected alternating current dynamo electric machines, one being synchronous and the other a wound secondary polyphase induction machine, an alternating current commutator machine connected to supply polyphase excitation to the secondary of said induction machine, means for supplying polyphase excitation to said alternating current commutator machine including a frequency changer exciter supplied at a frequency and driven at a speed in fixed relation to the frequency and speed of said synchronous dynamo electric machine, means for varying the voltage of the excitation supplied to said alternating current commutator machine and means for reversing the phase rotation of the polyphase excitation supplied to the secondary of said induction machine to change the ratio of frequency conversion of said set from one fixed ratio to another fixed ratio.

2. In combination, two alternating current systems, means for tying said systems together in a fixed frequency relation comprising a pair of mechanically connected alternating current dynamo electric machines having their primaries respectively connected to said systems one of said machines being a synchronous machine and the other being a wound secondary polyphase induction machine, means for supplying adjustable voltage polyphase alternating current excitation to the secondary winding of said induction machine at a frequency fixed in a relation to the frequency of the system to which the synchronous machine is connected and means for reversing the phase rotation of such polyphase alternating current excitation.

3. A frequency changer set comprising a synchronous dynamo electric machine mechanically connected to a polyphase wound secondary induction machine, a polyphase A.-C. commutator machine for supplying excitation to the secondary of said induction machine, means for alternatively supply polyphase A.-C. excitation at different frequencies to said A.-C. commutator machine, each of said frequencies being a fixed fraction of the frequency of said synchronous machine and means for reversing the phase rotation of the excitation supplied to the secondary of said induction machine.

4. Apparatus for converting alternating current power in a plurality of fixed frequency ratios comprising a synchronous dynamo electric machine and a polyphase wound secondary induction machine, a polyphase alternating current commutator machine connected to supply excitation to the secondary winding of said induction machine, means including a commutator type frequency changer exciter driven above its synchronous speed for supplying polyphase excitation to said A.-C. commutator machine at a frequency which is fixed in relation to the frequency of said synchronous machine, said frequency changer having brushes which are adjustable to shift the phase angular position of the polyphase excitation supplied thereby and means for reversing the phase rotation of the polyphase excitation supplied to said A.-C. commutator machines.

5. Frequency changer apparatus comprising mechanically connected synchronous and wound secondary induction polyphase dynamo electric machines, a polyphase A.-C. commutator machine connected to supply excitation to the secondary of the induction machine, frequency changer exciters having different frequency conversion ratios, connections whereby any one of said frequency changer exciters may be supplied at the frequency of said synchronous machine and supply polyphase excitation to the A.-C. commutator machine and means for reversing the phase rotation of such excitation.

6. Frequency converter apparatus comprising mechanically connected synchronous and wound secondary induction polyphase dynamo electric machines, a polyphase A.-C. commutator machine connected to supply excitation to the secondary of said induction machine, means including a frequency changer exciter for supplying polyphase excitation to said A.-C. dynamo electric machine, connections for supplying said frequency changer at the frequency of said synchronous dynamo electric machine and means for driving said frequency changer exciter at a plurality of different fixed speeds.

7. Frequency changer apparatus comprising mechanically connected synchronous and wound secondary polyphase dynamo electric machines, auxiliary apparatus for supplying variable voltage polyphase excitation to the secondary of said induction machine at a frequency which is a definite fraction of the frequency of the synchronous machine, means for reversing the phase rotation of said polyphase excitation relative to the direction of rotation of said induction machine and means for adjusting the phase angular position of such polyphase excitation relative to the polyphase voltage of the synchronous machine.

PERCY W. ROBINSON.